(12) United States Patent
Koryakin et al.

(10) Patent No.: US 7,856,547 B1
(45) Date of Patent: *Dec. 21, 2010

(54) FAST STUB AND FRAME TECHNOLOGY FOR VIRTUAL MACHINE OPTIMIZATION

(75) Inventors: Alexey B. Koryakin, Moscow (RU); Nikolay N. Dobrovolskiy, Moscow (RU); Andrey A. Omelyanchuk, Moscow (RU); Maxim A. Kuzkin, Moscow (RU); Alexander G. Tormasov, Moscow (RU); Serguei M. Beloussov, Singapore (SG); Stanislav S. Protassov, Moscow (RU)

(73) Assignee: Parallels Holdings, Ltd. (BM)

( * ) Notice: Subject to any disclaimer, the term of this patent is extended or adjusted under 35 U.S.C. 154(b) by 20 days.

This patent is subject to a terminal disclaimer.

(21) Appl. No.: 12/511,096

(22) Filed: Jul. 29, 2009

Related U.S. Application Data

(63) Continuation of application No. 11/530,080, filed on Sep. 8, 2006, now Pat. No. 7,581,085.

(60) Provisional application No. 60/714,847, filed on Sep. 8, 2005.

(51) Int. Cl.
*G06F 9/30* (2006.01)
*G06F 9/40* (2006.01)
*G06F 15/00* (2006.01)

(52) U.S. Cl. .................................................. 712/209
(58) Field of Classification Search .................. 712/209
See application file for complete search history.

(56) References Cited

U.S. PATENT DOCUMENTS

| 6,470,424 | B1 | 10/2002 | Adams |
| 6,763,452 | B1 | 7/2004 | Hohensee et al. |
| 6,954,923 | B1 | 10/2005 | Yates, Jr. et al. |
| 2003/0217250 | A1 | 11/2003 | Bennett et al. |
| 2004/0117532 | A1 | 6/2004 | Bennett et al. |

OTHER PUBLICATIONS

Scott et al.; Safe Virtual Execution Using Software Dynamic Translation; IEEE; 2002.
Scott et al.; Strata: A Software Dynamic Translation Infrastructure; 2001.

*Primary Examiner*—Eddi P Chan
*Assistant Examiner*—Corey Faherty
(74) *Attorney, Agent, or Firm*—Bardmesser Law Group

(57) ABSTRACT

A method and system for handling of potential unsafe instructions and/or for handling transfers of control in a Virtual Machine, that includes generating a frame composed of pages of analyzed code based on original guest code; identifying instructions within the frame that transfer control (or are otherwise unsafe); replacing instructions that transfer the control with an interrupt that transfers control to a stub in non-privileged code; wherein the stub checks whether the control transfer (or instruction) is safe or unsafe, and (i) for unsafe control transfers/unsafe instructions, switches the context to Virtual Machine Monitor; and (ii) for safe control transfers, executes the control transfer in non-privileged mode. The instructions that transfer control can include any of JMP, CALL, RET and RET(n). The instructions that transfer control can also include interrupts.

15 Claims, 7 Drawing Sheets

Frame mapping

FAST STUB AND FRAME TECHNOLOGY FOR VIRTUAL MACHINE OPTIMIZATION

CROSS-REFERENCE TO RELATED APPLICATIONS

This application is continuation of U.S. patent application Ser. No. 11/530,080, Filed: Sep. 8, 2006, entitled FAST STUB AND FRAME TECHNOLOGY FOR VIRTUAL MACHINE OPTIMIZATION, which is a non-provisional of U.S. Provisional Patent Application No. 60/714,847, filed on Sep. 8, 2005, entitled FAST STUB TECHNOLOGY FOR VIRTUAL MACHINE OPTIMIZATION, which is incorporated by reference herein in its entirety.

BACKGROUND OF THE INVENTION

1. Field of the Invention

The present invention relates generally to Virtual Machine (VM) technology and, more particularly, to methods and systems for optimization of transfers of control in VM guest code.

2. Background Art

With VM technology, a user can create and run multiple operating environments on a computer at the same time. Each operating environment, or Virtual Machine, requires its own operating system (OS) and can run applications independently. The VM software provides a layer between the hardware of the computing system and the software that runs on it.

Frequently, the problem arises of simultaneously running different operating systems on the same hardware system. For example, with one version of MICROSOFT WINDOWS running on the computing system, it can be necessary to start another instance or another version of WINDOWS or another operating system, on the same hardware system.

A typical Virtual Machine Monitor (VMM) enables a single physical machine or processor to act as if it were several physical machines. A VMM, typically jointly with a high-ranking OS (although there are VMMs that can be executed on bare hardware, without a high-ranking OS), can run a number of different operating systems simultaneously, such that each of the different operating systems has its own VM. In other words, a typical VMM can handle a number of VMs, each of which represents its own OS, and each of which can run its own application software and control or use its own hardware, including certain types of processors, I/O and data storage devices, and so on, as if they were running on a single processor. The high-ranking OS is typically referred to as a "host OS" (HOS), or a "Primary OS." The multiple operating systems that are running as VMs are typically referred to as "guest operating systems" ("guest OSs") running "guest code."

A conventional approach for implementing VMs includes a VMM approach developed by IBM and implemented on mainframes, which support virtualization. Another approach includes implementing VMM on modern processors, which do not support the hardware virtualization, such as full step-by-step or page-by-page interpretation of the original code, or full binary translation of the original code, or combining binary translation of some portions of the original code and direct execution of other portions of the original code.

One of the common problems in Virtual Machine technology is the overhead that results from processing of privileged but unsafe instructions, also known as processing of "code under control." In particular, in the context of many Virtual Machine implementations, such as, for example, described in U.S. patent application Ser. No. 11/139,787, entitled METHODS AND SYSTEMS FOR SAFE EXECUTION OF GUEST CODE IN VIRTUAL MACHINE CONTEXT, filed on May 31, 2005, which is incorporated herein by reference in its entirety, the high cost of the exceptions needed to handle the privileged but unsafe instructions is of particular concern. In other words, triggering, or raising, the exceptions is one of the major sources of overhead.

In reality, the number of instructions that are actually privileged but unsafe is relatively low. A significant percentage of overhead relates to handling of jumps within the code, where it is necessary to ensure that the execution of the code does not start executing in an area of memory, or in a page in memory, where it is not supposed to be. Thus, exceptions are normally needed to handle such transfers of control, where the exception is used to analyze the destination address to which control is transferred, and also to process any related activities, such as analysis of the code at the destination address, etc. The control transfers can be handled by, placing an INT3 interrupt, instead of the JMP instruction (or some similar instruction), to switch the context to the Virtual Machine Monitor (VMM), where the JMP instruction is then handled or emulated. The JMP instruction itself normally has a ring 3 level of privilege (using the INTEL architecture terminology), if it is part of the guest code. The JMP instruction is therefore replaced by an INT3 interrupt, which changes the context from the guest code/VM context (ring 3) to the VMM context, which is at ring 0. Upon the raising of the exception with INT3, the VMM loads its own register flags (which is inherently part of the context switching), and then proceeds to analyze the jump instruction to determine just what exactly needs to be done to handle this situation.

The handling of the JMP instruction can involve the decoding of instruction, emulation of the instruction and then subsequently switching the context back to the VM and guest code. This entire process, in the Pentium IV architecture takes approximately 4,000 clock cycles.

The JMP instruction itself, in the native mode, can take on the order of 10-30 clock cycles to execute (depending on the processor, processor model, and the type of the JMP instruction). In other words, processing JMP instructions by treating them as privileged but unsafe instructions is approximately two orders of magnitude more costly compared to executing them in a native mode using direct execution.

Accordingly, there is a need in the art for efficient execution of transfers of control in the guest code in a VM context.

BRIEF SUMMARY OF THE INVENTION

The present invention is directed to methods and systems for handling potentially unsafe instructions and for handling transfers of control in the guest code inside a Virtual Machine that substantially obviates one or more of the problems and disadvantages of the related art.

In one embodiment, a method, system and computer program product for handling potentially unsafe instructions in a Virtual Machine includes generating a frame composed of pages of analyzed code, the frame being based on original guest code; identifying potentially unsafe instructions within the frame; and replacing selected potentially unsafe instructions with control transfer to a stub in non-privileged code. The stub checks whether executing the potentially unsafe instruction is safe or unsafe. For instruction identified as unsafe, the stub switches a Virtual Machine Monitor context to full emulation. For instruction identified as safe, the stub bypasses the instruction in the Virtual Machine context.

Potentially unsafe instruction can include any of JMP, CALL, RET and RET(n), PUSHF and POPF, etc., in the Intel architecture.

Additional features and advantages of the invention will be set forth in the description that follows. Yet further features and advantages will be apparent to a person skilled in the art based on the description set forth herein or can be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Figure 1:
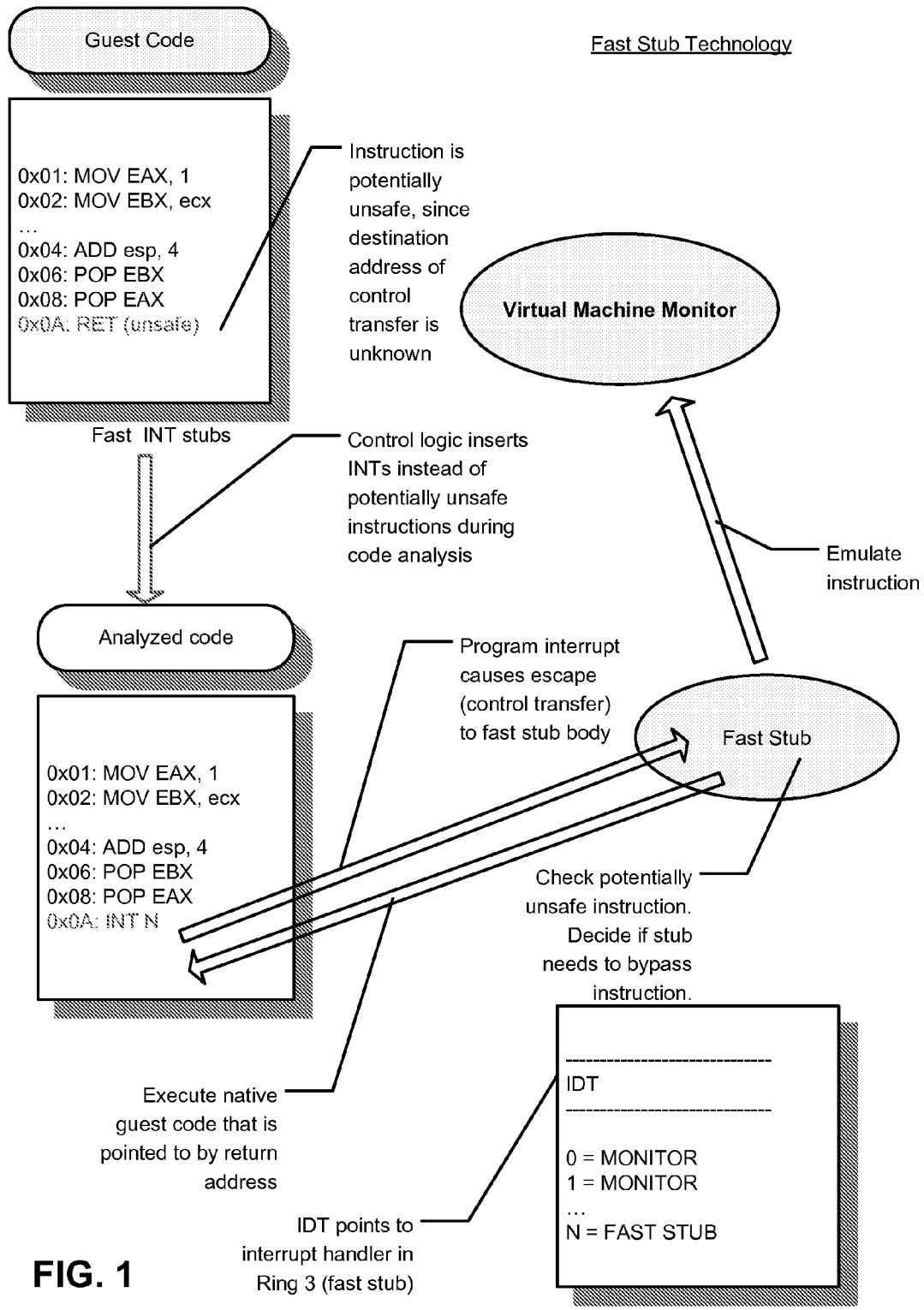
FIG. 1 illustrates how fast stubs based on event generation (using INT N) are used to reduce overhead associated with handling potentially unsafe transfers of control.

Reference will now be made in detail to the embodiments of the present invention, examples of which are illustrated in the accompanying drawings.

In the remainder of this description, it is assumed that the reader is familiar with VM concepts generally, and with INTEL processor architecture and instruction set, and, therefore, the discussion of the details of the INTEL architecture is necessarily limited in this description. The IA-32 INTEL Architecture Software Developer's Manuals, Volumes 1-3, see http://www.INTEL.com/design/pentium4/manuals/index_new.htm#1, and the INTEL Itanium Architecture Software Developer's Manuals, Volumes 1-3, see http://www.INTEL.com/design/itanium2/documentation.htm#manuals, which are incorporated herein by reference in their entireties, provide detailed discussions of the INTEL Architecture and VMX technology. Also, technologies, processors and chipsets from other manufacturers, such as AMD (Pacifica), MOTOROLA and so on can support the VMM approach described herein. Although particular examples relate to the INTEL architecture, the approach described herein is not limited to the INTEL architecture, and can be implemented with other processor families and processor architectures.

In the INTEL family of processors, various "privilege levels" are different modes of operation that are characterized, e.g., by different sets of available instructions and accessible registers. Privilege levels may be set through appropriate processor registers.

The techniques described herein provide an effective procedure for implementation of a VM designed for execution of user instructions and particularly instructions of the VM's OS (usually referred to as "guest OS"). Types of instructions that can be singled out in the software code to be executed in the VM include "safe instructions" and "unsafe instructions." Additionally, some kinds of instructions can be singled out in the software codes if the instructions themselves are unsafe, but the code sequences are safe. Safe instructions are instructions that produce the results expected by the guest OS when executed in the VM. Unsafe instructions are instructions that produce results different from those expected by the guest OS when executed in the VM, or that are unsafe from the viewpoint of the VMM or HOS. Additionally, some instructions can be either safe or unsafe instructions, depending on the environment of their execution that is set up by the VMM for their execution, e.g., guest OS code. Such an environment will be referred to below as "VM context."

The context settings may include hardware processor registers settings, which define instructions being executed by the hardware processor. Also, context settings may include system libraries being accessed by applications, mapped memory pages, settings of the hardware being emulated in the VM and so on. In one approach, original (i.e., source) guest code can be executed using the software debugger as follows:

Before execution, the VMM analyzes the original guest code. The VMM generates modified (i.e., target copy) guest code by replacing potentially unsafe instructions with breakpoints (e.g., INT3 interrupts). During execution of the modified guest code, control is transferred to the VMM at the interrupts. In turn, the VMM, depending on the state of the VM, either restarts the guest code without emulation or emulates the potentially unsafe fragment of guest code in the emulation mode.

Note that "original" guest code (or "source" guest code) generally refer to unanalyzed guest code, while "modified" guest code (or "target" guest code) generally refer to analyzed and modified guest code that has been processed (e.g., by insertion of breakpoints in the original guest code) for direct execution by the VM. In one embodiment breakpoints can be placed directly into original code. Alternatively, breakpoints can be placed into a copy of the portion of the original code. In that case, the same absolute effective (EIP) addresses of the instructions of the target code should be maintained. One possible technique can be to change guest code segment (CS) descriptor base address in the GDT (global descriptor table).

In one approach to Virtual Machines, a software debugger can be used to set up breakpoints, or interrupts, forcing the processor to raise exceptions (e.g., to prevent illegal access to memory or to input/output devices). Optionally, instructions that cause the processor to raise exceptions can be used as breakpoints.

Exception handling may be based on using a paging model of address processing by the processor, and can be implemented as follows:

1. A page of the original guest code is analyzed;
2. A copy of the page of the original guest code is created, and certain unsafe instructions are replaced with breakpoints to generate a modified (analyzed) page of guest code;
3. The modified (analyzed) page of guest code is executed; and
4. During execution of the modified (analyzed) page, control is transferred to the VMM if exceptions are raised at the breakpoints, and the VMM (by analyzing the VM context) either (i) generates bypassing code, which does not contain unsafe instructions, or (ii) provides for execution of the unmodified original guest code, or (iii) provides for execution of different code, which ensures that the execution of the potentially unsafe instructions becomes safe, for example, by adjusting the VMM context.

Note that in addition to the modified page of the guest code, a copy of the original page of the guest code is also stored, because the VMM subsequently provides for the safe execution or emulation of instructions based on analysis of the original guest code.

Usually the guest OS code includes many relative JMP, CALL and RET instructions. their primary function and the primary reason for these instructions being unsafe is passing execution to another address that is stored at some location in memory. Therefore, the following description will primary deal with such instruction stubbing, although this is just one of many examples, and the invention can be used for stubbing any potentially unsafe instruction.

Therefore, what is needed is a mechanism that can rapidly check whether the JMP instruction, upon being encountered, is safe or unsafe. This can still be performed in the native mode, without switching to the context of the VMM, by using stubs. Such a fast stub is, in effect, a small handler, or processing routine, whose primary (or even sole) purpose is to determine whether the JMP instruction is safe or unsafe. If the JMP instruction is unsafe, then the stub will switch the context to the VMM, such that the JMP instruction will then be processed as an unsafe instruction in the VMM, for example, by emulation. If the JMP instruction is safe, which can be the case in as many as 99 percent of the cases, then control can be directly transferred to the location to the JMP instruction's destination address. Note that in the INTEL architecture, if INT3 is used as the interrupt that raises exceptions at privileged but unsafe instructions, then INT1 (or some other interrupt) can be used to handle the JMP instructions to transfer control to the so called fast stub (JMP instruction handler). (Alternatively, if INT1 is used for raising exceptions and context switching, then some other interrupt INT (n), such as INT3, can be used.)

Note that the handling of the JMP instructions if they in fact turn out to be safe, using the fast stub approach takes approximately 200 clock cycles in the Pentium IV architecture— compared with roughly 4,000 clock cycles for full VM/VMM context switch. In other words, the processing of JMP instructions is much closer to direct execution than to the heavy-overhead scenario of fully emulating the JMP instructions at the highest privileged level in the VMM.

If INT3 is the "full blown" context switch, then INT1 can be used for fast stubs. Note also that the advantage of using INT1 is that it is a single byte instruction, which is guaranteed to fit within the body of the guest code, without having to shift any of the subsequent instructions. In other words, the offset addresses of all the instructions within the guest code can be preserved. Other instructions that are multi-byte instructions can use other interrupts that are, correspondingly, multi-byte interrupt.

For example, INT1 interrupt can be used to process one byte instructions, which are RET, PUSHF and POPF. Two-byte interrupt INT (n) can be used to process multi-byte instructions such as RET (n), indirect JMP and indirect CALL. These instructions account for approximately 95 percent of the emulated instructions, absent a mechanism for processing them in a native mode, or something close to the native mode.

For such instructions, stubs can be used to quickly check the "safety" of an instruction. A stub is a remote procedure called upon to perform some task. The stubs can be located in the VM context, as well as in VMM context. In the case of indirect JMP instruction execution, when an exception is raised (due to INT1), the VMM gets control and checks whether the transfer of control is intra-frame or inter-frame. If the transfer is an intra-frame transfer of control, then execution of the guest code is resumed. If the transfer is an inter-frame transfer of control, then the current frame is switched, and execution of the guest code is also resumed. Fast stub switches to full JMP emulation if the frame check fails.

At this point, it is useful to discuss how paging and frame technology fit in with fast stubs. A "page," in the INTEL architecture, is a 4 KB block of memory. This is a relatively small number. As such, for typical operating system or user application code, there will be numerous transfers of control between pages. Accordingly, a "frame" is a contiguous combination of sequential pages, whose size is empirically chosen to be not too large and not too small, so that most transfers of control are within a single frame and do not raise exceptions. Empirically, a 4 MB frame is approximately optimal, although the particular optional size of the frame depends on the processor and the code being executed.

Consider, therefore, a situation when guest code begins to be executed, but the page in which that guest code is located is not yet mapped into the frame. Therefore, attempting to execute the first instruction in the guest code will generate a page fault. In other words, the page with that guest code will be initially marked as not present. The guest code in that page will be analyzed, appropriate exceptions and interrupts added to the code, and a page of analyzed code corresponding to the original (source) code will be created. That page with the analyzed code will be mapped to the frame. Over time, a number of other pages with the guest code will be analyzed, and added to the frame, ultimately filling up (or, optionally, only partly filling) the entire 4 MB frame.

The guest code is then executed in such frames. Frame code segment base is calculated, thus, the EIP of the code located on modified pages corresponds to original EIP.

One of the aspects that needs to be addressed when virtualizing the INTEL processor is a phenomenon sometimes referred to as "ring compression." In the INTEL architecture, there are four privilege levels, with level (ring) 3 normally being used for user application code, and ring 0 normally used for operating system code. Some operating systems utilize all four levels available in the INTEL architecture, while other utilize only ring 0 and ring 3. For example, WINDOWS only uses ring 3 for user application code, and ring 0 for OS code. OS/2, on the other hand, utilizes all four ring levels. However, in the Virtual Machine as discussed herein, all the levels are compressed into a single level—ring 3. Thus, There are two common type of ring compression:

0/1/2/3 to 1/2/3 rings; and

0/1/2/3 to 3 ring.

That means that the guest code can "think" that it is running in any of the privilege levels, however, in reality it is always running on ring 3 level. This, however, needs to be transparent to the Virtual Machine. The VMM cannot launch the guest code "as is" due to ring compression, because there might be unsafe instructions there. Ring compression is a well known technology to de-privilege guest code, so that it cannot corrupt supervisor's (i.e. VMM's) system areas.

Unsafe instruction's behavior can depend on privilege ring where it is executed. For example, the pop flags (POPF) instruction affects fewer flags on ring 3 than it does on ring 0. If the VMM compresses guest ring 0 to real ring 3 (0/1/2/3 to 3), POPF does not affect all the flags. Therefore such instructions are unsafe and should be generate exceptions.

To detect unsafe instructions, VMM should analyze guest code before execution and, as one option, generate a copy of guest code where unsafe instructions are marked by events that trigger exceptions. For example VMM can place INT3 (or INT n) into the guest code, where the unsafe instructions were.

As one option, to execute a copy of the guest code, the VMM creates an environment by mapping analyzed pages to linear space using frames.

As long as the destination address to which control is transferred is known for all instructions within the analyzed code, it is at least theoretically possible to have a frame, all of whose guest code instructions can be directly executed in the native mode.

During analysis of guest code, instructions to transfer control to previously unknown addresses might be encountered (e.g., RET, CALL EAX, etc.). For such instructions, it is impossible, during the code analysis phase, to determine whether the transfer of control is safe (i.e., an intra-frame transfer) or unsafe (i.e., and inter-frame transfer).

In this case, all the RET instructions are potentially unsafe since a priori all the RET instructions depend on a CALL instruction that can cause a "return back to another frame" transfer. This is an issue present in virtually all modern processor architectures—there are instructions that transfer control to a destination address that is determined at run time, rather than at the analysis stage. Some examples of these instructions are CALL, JMP, RET and RET(n), in the INTEL architecture. Other processor architectures have similar instructions.

It should also be remembered that even those instructions for which the destination address is unknown, in greater than 90 percent of the cases, control is transferred within the same frame. Therefore, with these instructions, it is necessary to address the issue of how to execute these instructions in something approximating the native mode, without having to go through the full context switch to the VMM, and back to the VM after the emulation.

To address the issue of increased overhead for processing inter-page transfers of control, a paging technique can be used that integrates pages of guest code into linear frames. As a result, intra-frame transfers are safe, inter-frame transfers are also safe, while out-of-frame transfers are unsafe. Thus, the number of exceptions raised during execution of the guest code substantially decreases, and overhead is reduced accordingly.

Note that more than one frame can be mapped simultaneously. Each frame can represent a different guest OS address range. All inter-frame control transfers for currently mapped frames can run natively, without switching to the VMM context. An inter-frame control transfer targeting a currently unmapped frame leads to invoking the VMM and remapping a least-used frame with a new one. Then, execution continues. This allows covering control transfers of a very wide address range that cannot be covered by a single "monolithic" frame.

In one approach, a frame is created as follows. An area of guest linear address space that is divisible by 4 MB (an exemplary size selected based on empirical considerations) is selected for the executable code. To identify this area in the VM context, a set of values of a page directory entry (PDE) is used, where each PDE can reflect 4 MB of the address space. Thus, a frame is set of sequential pages, where the number of pages in a particular implementation is determined beforehand, and where each of the pages is defined by a corresponding index of the PDE.

In another approach, during analysis of the instructions of a frame of guest code, the frame is initially characterized only by one addressable page, and the other pages are mapped as "not present." Subsequently, the frame can be filled with analyzed pages of guest code. If control is transferred to a page that is mapped as "not present," an exception is raised (i.e., a page fault exception), and the VMM obtains control and analyzes the next portion of the guest code. After analysis, the VMM transfers control back to the frame.

INT(n)-based stubs divide interrupts to two type: one standard type of interrupt, such as INT3, to mark all unsafe instruction to pass execution to the heavy-duty VMM universal handler; and at least one interrupt, such as INT1, INT n1, INT n2, etc., to mark unsafe instructions that can be bypassed after a quick check. (Note that interrupt numbering here is exemplary only.) Thus, two types of interrupts can coexist— standard and bypassed ones. In a real system, the interrupt number can be swapped: e.g., INT1 can be used for standard emulation and INT3 can be for instruction stubbing. In this discussion, INT3 will be used for marking unsafe instruction to emulate them in VMM, and INT1 or INT(n) will be used for marking stubbed unsafe instructions.

In one approach, fast INT(n) stubs are used to replace unsafe instructions (such as RET or RET(n)) with INT1 opcodes (again, the interrupt number is exemplary). If fast stub technology is not used, unsafe instruction is marked by standard scheme, with interrupt generation by INT3 to switch to the VMM's full instruction virtualization/emulation algorithm. The interrupt raises an exception, a switch from a Ring 3 privilege level to a Ring 0 privilege level (in the INTEL architecture) occurs, and the VMM emulates unsafe instructions. Then, after instruction emulation, VMM passes execution back to Ring 3 to the next instruction of guest OS code. Native guest code execution continues up to the next instruction that generates an interrupt and the process repeats again.

This technique is time consuming and can be optimized by replacing some instructions with an INT(n) interrupt and a lightweight handler. An exception handler, corresponding to the n vector of the interrupt, is on the same Ring 3 privilege level and simply checks whether the unsafe instruction can be run natively or whether it should be emulated by using main scheme (e.g., a standard INT3 emulation based described above). In other words, some types or classes of instructions can be replaced with INT(n) interrupts. Control is then transferred to an exception handler, which either executes (bypasses) the instruction and transfers control back to the native code or calls the Ring 0 privilege level exception handler.

FIG. 1 illustrates the concept of how fast stubs and INT(n) interrupts are used to reduce overhead associated with handling potentially unsafe transfers of control. As shown in FIG. 1, the guest code has an unsafe instruction, in this case the RET instruction at the address 0x0A. In this case, it is potentially unsafe because the address to which it returns, or transfers control to, is unknown at the time of code analysis. The guest code is analyzed, and the RET instruction is replaced with an INT(n) interrupt. In this case, if the INT(n) interrupt is actually INT1, then the fast stub is called upon encountering the INT1 interrupt.

The fast stub checks whether the instruction is actually safe, or unsafe, rather than merely potentially unsafe, with the empirical observation that in most cases, the instruction is safe. If the instruction is actually safe, in other words, if control is transferred within the same frame, then control is returned to the instruction following the INT(n) interrupt. In the case of instructions that transfer control, e.g., RET in FIG. 1, execution is resumed from the instruction to which the control is transferred. In the rare cases where the RET (in this case) instruction is actually unsafe (as opposed to merely potentially unsafe), control is then transferred to the Virtual Machine Monitor, where the unsafe instruction is handled, through the full context switch to the VMM and subsequent emulation.

Thus, the stub in FIG. 1 checks several things:

(a) Whether the jump to a previously unknown destination address is within the same frame. In this case, the stub permits the jump.

(b) If the jump is to a different frame (outside the current frame), then the stub checks whether that destination frame has already been mapped to the 16 MB superframe (see discussion below regarding superframes). If it has, then the jump is permitted in the native mode.

(c) If none of the above conditions are satisfied, then the jump (or other control transfer) is emulated in the VMM. The VMM therefore, as part of the emulation, needs to check where the destination address is, whether it needs to add the destination page to the frame, or add the frame to the superframe linear address space, whether it needs to "toss out" one of the frames already in the superframe and map a different frame into the same (in this case) 16 MB address space, execute or emulate the jump (or control transfer), and then return control back to the VM.

The optimization as described above works particularly well for WINDOWS, because, as a practical matter, virtually all the code at issue fits within four or five frames, the absolute majority of inter-frame control transfers is between two or three frames, and the remaining one or two occur very rarely. Thus, virtually all inter-frame transfers can be handled in something approximating a native mode.

Another related optimization aspect is the handling of the INT(n) interrupts themselves. Compared to a "regular" instruction, which takes approximately 20-30 clock cycles to execute, the handling of the INT(n) interrupt itself takes several hundred clock cycles. Sometimes the stub handler can take 600 clock cycles. This is another significant source of overhead, which needs to be addressed.

Therefore, it is desirable to avoid the use of INT(n) interrupts, wherever possible, if the same purpose can be accomplished by using other mechanisms. It so happens that in the INTEL architecture, the simple JMP is the fastest way to transfer control. The simple JMP takes approximately 10 clock cycles. This is a dramatic improvement over the use of interrupts. The simple JMP instruction can be used to transfer control to a stub, which will then perform the appropriate checking of the original instruction and the destination address. It can reduce the number of cycles needed by the stub handler to about 60 clock cycles.

Thus, fast JMP stubs can used to reduce overhead associated with interrupts. Instead of INT(n) opcodes, JMP instructions are used to replace specific instructions or sets of instructions. This technique operates similar to, but is faster than, the technique using the INT(n) stubs. However, one problem in this case is that a JMP instruction opcode is longer than an INT(n) opcode. Thus, a block of instructions can be replaced with a first JMP instruction (i.e., if the JMP opcode is five bytes in length, then the unsafe instruction itself and up to four instructions before it are replaced). If the instruction that it replaces in the original code is shorter than five bytes, then adjacent instructions (either the four bytes before, or the four bytes after, in the case of using a JMP to replace an INT(n) interrupt) would have to be overwritten. This problem is addressed using "shadow page" and "shadow frame" concepts. In addition to the analyzed code, a page with shadow code is created. Those four (or however many) bytes that were overwritten by the JMP instruction are copied to the shadow page, in order to avoid "losing them."

The safe instructions that are replaced by the first JMP instruction are copied to a temporary (shadow) page called by the first JMP instruction. A second JMP instruction that points to a stub is inserted after the safe instructions on the shadow page. During execution, the first JMP instruction transfers control to the safe instructions on the shadow page. After the safe instructions are executed, the second JMP instruction transfers control to the stub. Inside the stub, the potentially unsafe instruction is checked to determine whether it can be run natively or whether it should be emulated by the primary INT3 scheme.

Using JMP stubs is faster than using INT(n) stubs because the exception for INT(n) handler requires additional pushing and saving of the register stack and subsequent popping and loading of the stack.

Figure 2:
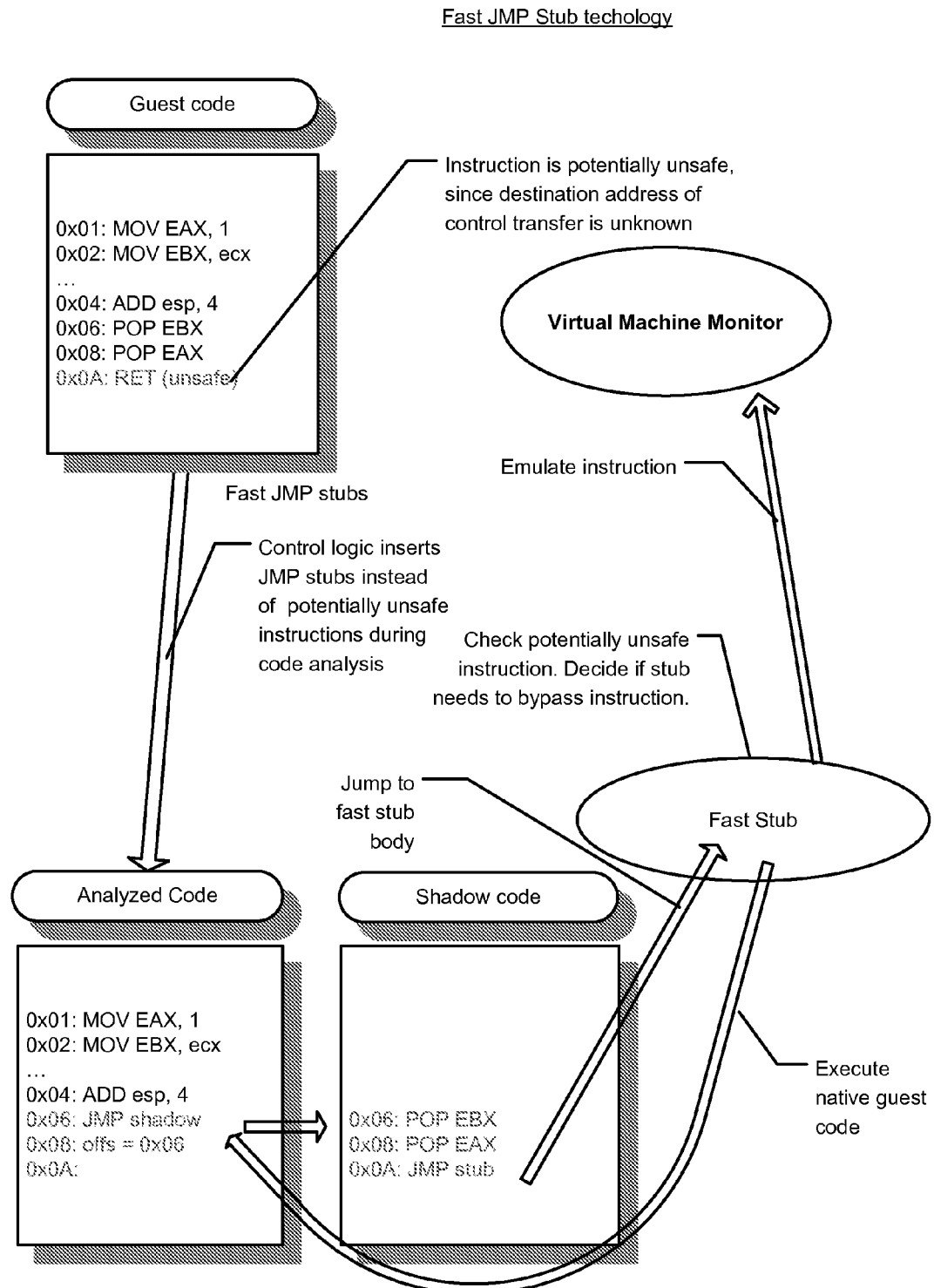
FIG. 2 illustrates an alternative optimization of fast stubs that uses shadow pages and shadow frames.

FIG. 2 illustrates the use of shadow pages and shadow frames in connection with JMP stubs. As shown in FIG. 2, the original guest code contains a potentially unsafe RET instruction. The analyzed code contains a jump to a shadow page. The shadow page contains the instructions just prior to the RET instruction in the original guest code, in this case, POP EDX, and POP EAX. As the analyzed code is executed in the native mode, the control is transferred to the shadow page upon encountering the JMP instruction. The two instructions POP EDX and POP EAX are executed, and then control is transferred to the fast stub. The fast stub then handles the processing of the RET instruction, to determine whether it is safe (and control can be passed in the native mode), or unsafe (and therefore that instruction needs to be executed in the Virtual Machine Monitor).

Figure 3:
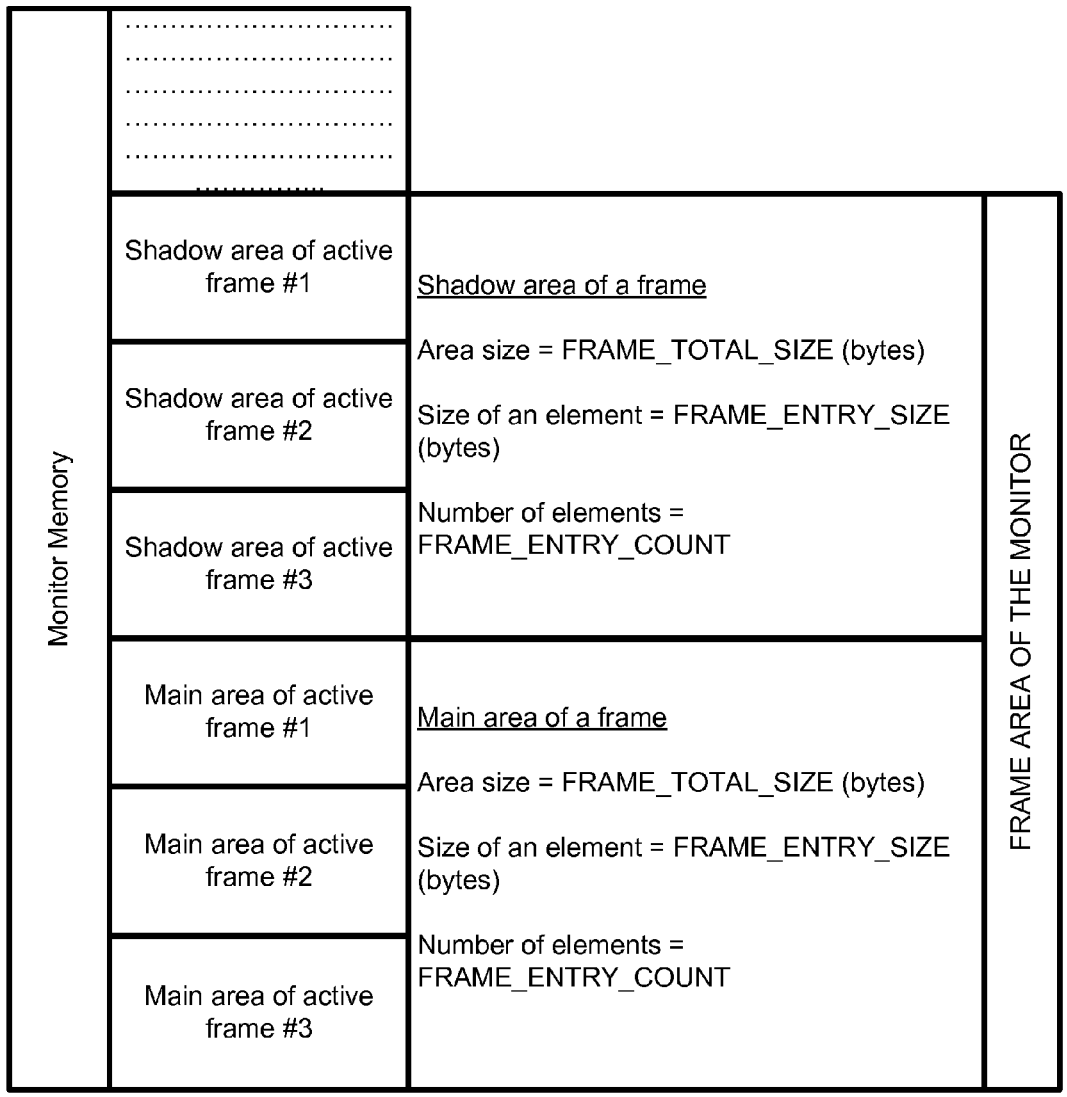
FIG. 3 illustrates an example of how frames are mapped in the Virtual Machine Monitor.

FIG. 3 illustrates the exemplary approach to how frames are mapped in the Virtual Machine Monitor. The total address space, shown on the left hand side of FIG. 3, includes several active frames that contain analyzed code, in this case, active frame #1, active frame #2 and active frame #3. Collectively, this set of frames may be referred as a "superframe." For every such active frame that contains analyzed code, there is a corresponding shadow frame, in this case, shadow frame #1, shadow frame #2 and shadow frame #3. Note that the sizes of the corresponding frames, as expected, are identical for the active frames and the shadow frames. Furthermore, it should be remembered that the invention is not limited to the use of shadow areas, or shadow areas as illustrated in FIG. 3. Dynamically sized shadow areas can be used, where all the shadow code is collected from all the instruction blocks of the analyzed code. In this case, a guest instruction pointer translation needs to be done during exceptions on shadow pages. Note also that as a practical matter, most of the code in the shadow frame is usually null opcodes, or NOP opcodes, although this need necessarily not be the case, and the invention is not limited to this implementation.

For example, the monitor can divide the available memory into a cache of analyzed pages, a cache of shadow pages, an area where fast stubs reside, and an area where the VMM's residual data and other "housekeeping" information can reside. The active frames can be divided into active frame #1 and active frame #2, that contain analyzed code. For these frames, there are corresponding shadow frames #1 and shadow frame #2.

FIG. 3 shows one example of superframe organization. An alternative organization can utilize superframe division into frames. Each frame includes a shadow part and a part with analyzed pages. In this case, the common idea is that that the frame has shadow and analyzed code parts.

There is a special register in the INTEL architecture, called the code segment register (CS), which the processor checks prior to execution of any code. For every source code portion, there is a corresponding value in the CS register (which defines the start address of the segment, the privilege level, and the limits, or size, of the segment, such that the entire segment in memory is linear and is uninterrupted in terms of its addresses). After being analyzed by the VMM, the page is found at a different address, with the absolute addresses being different in the target code as compared to the addresses of the source code (if nothing is done to ensure that address integrity is preserved).

Note that the executed instructions addresses in fact are derived using the beginning address of the segment in the CS register as a base (translation effective address used as a simple pointer to linear one). This means, that, in order to preserve the integrity of the addressing scheme in the target page, the start address in the CS register descriptor needs to be correspondingly shifted as well. In other words, by changing the value of the start address of that segment, it is possible to ensure that instructions, which require both absolute and relative addresses to return a correct result, will get a correct address value. (For example, such a scheme allows CALL instruction to place a valid return pointer onto the stack and to pass control to a valid function). However, since the descriptor of the CS register has been modified and the code segment register no longer points to the correct area, the instructions using data access through the CS register need to be emulated. Therefore, such types of unsafe instructions are replaced with breakpoints, or exception triggers, due to code segment being marked for execute only type.

Phrased another way, the values in the CS register that previously corresponded to the guest code are replaced with new values. This is done such that the starting address in the CS register descriptor is always shifted compared to the original address for the source code. The end result is that the target page in the cache that is actually executed by the VM is effectively at the same address as the original (source) code of the guest code was.

A new base address in the descriptor of the CS register is set for the area of the guest linear space where the current frame is mapped. Note also that this is done only for the CS register. The other registers, such as the data segment register (DS), stack segment register (SS), extra segment registers (ES, FS, GS), and others, all point to where they previously pointed to in the guest code.

Figure 4:
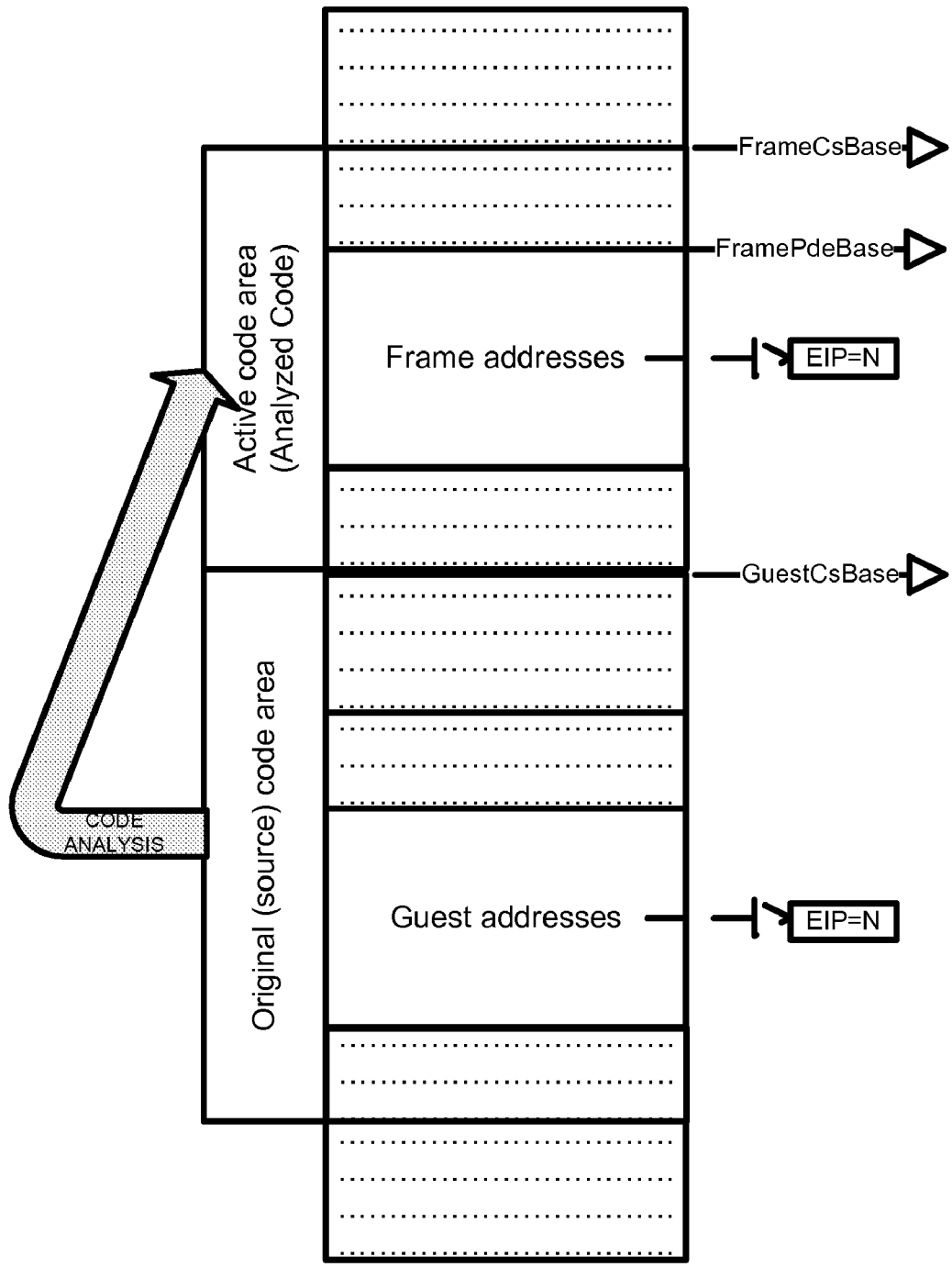
FIG. 4 illustrates the concept of using the CS register to map frames.

FIG. 4 illustrates the concept of using the CS register to map frames. As shown in FIG. 4, the address space includes the source (guest) code segment, that have their own linear addresses region. The EIP points to current executed instruction. The EIP is offset from the base address value of CS segment, i.e., the linear address of current instruction is generated by adding the CS segment base value and the EIP. The VMM executes analyzed code with marked unsafe instructions. Such analyzed pages are located in the frame before execution. The Frame memory area is shifted relative to original code pages. Therefore, the VMM sets up a corresponding shifted CS segment register value, such that by adding it to the guest EIP pointer, the EIP will point to the correct analyzed code. The EIP is a pointer to the current instruction within that frame, and contains the address of the instruction that is being currently executed.

For each original guest code frame, there is an analyzed, or active, part which contains the code that is safe to execute in the nature mode. The instruction pointer EIP in the analyzed code has the same exact value as the instruction pointer in the original guest code. The only difference is that the CS register points to the base address of the analyzed code segment, rather than the original guest code.

Furthermore, one of the realities of many modern operating systems is that the operating system code is often be widely separated in memory space, and frequently including several such separated areas in memory, each of which requires its own frame. Therefore, it is desirable to extend the fast stub approach described above to the multi-frame situation.

For example, in the Microsoft WINDOWS XP operating system, there is a driver area, and a hardware access layer (HAL) area, which can be separated by a large gap, for example, 200 megabytes in address space. Also, that 200 megabyte "gap" between the driver area and the HAL area might be essentially empty, with control jumping back and forth on a relatively frequent basis. At the same time, it is very difficult to construct a frame that would adequately "capture" all of the code of many such operating systems.

To address this situation, it is possible to create a linear space, for example, 16 MB in length, into which four frames are mapped, thereby forming 16 MB superframe. Each frame gets its own CS segment register (a base address), and jumps between the frames (but within the 16 MB superframe's address space) can be performed using a "far JMP" with corresponding frame selector (new CS) where control is transferred to. A far jump differs from a near jump in that the pointer to where control is transferred has two parts: a destination code segment selector and an offset in it. A near jump transfers execution within in a single code segment (and is a jump to a relative address). A far jump transfers control outside the segment (and is based on the absolute address). However, the destination address of a far JMP instruction is known in advance, and such far JMPs can be handled natively. The jump is accomplished by changing the value of the CS register descriptor, in other words, by changing the base address.

The CS register holds the base address, or the address from which all other addresses are calculated. Thus, an instruction that looks like JMP+100 jumps to the [current address+100], where the current linear address (and, as a result, the physical address) can be calculated using the CS register.

Thus, in order to preserve the offset addresses for the jumps within each frame, the base address, in other words, the value in the corresponding CS register, is changed, to "fool" the processor into thinking that it is still executing within the same frame. The far JMP instruction accomplishes that by specifying both the CS (base address) value and the offset address (within the particular frame) for the destination address.

Note that although the number of clock cycles necessary to execute a far JMP is greater than the number of clock cycles necessary to execute a near or short jump, nonetheless, the number of clock cycles necessary even for a far JMP is still far less than the number of clock cycles required for a full context switch and emulation.

Figure 5:
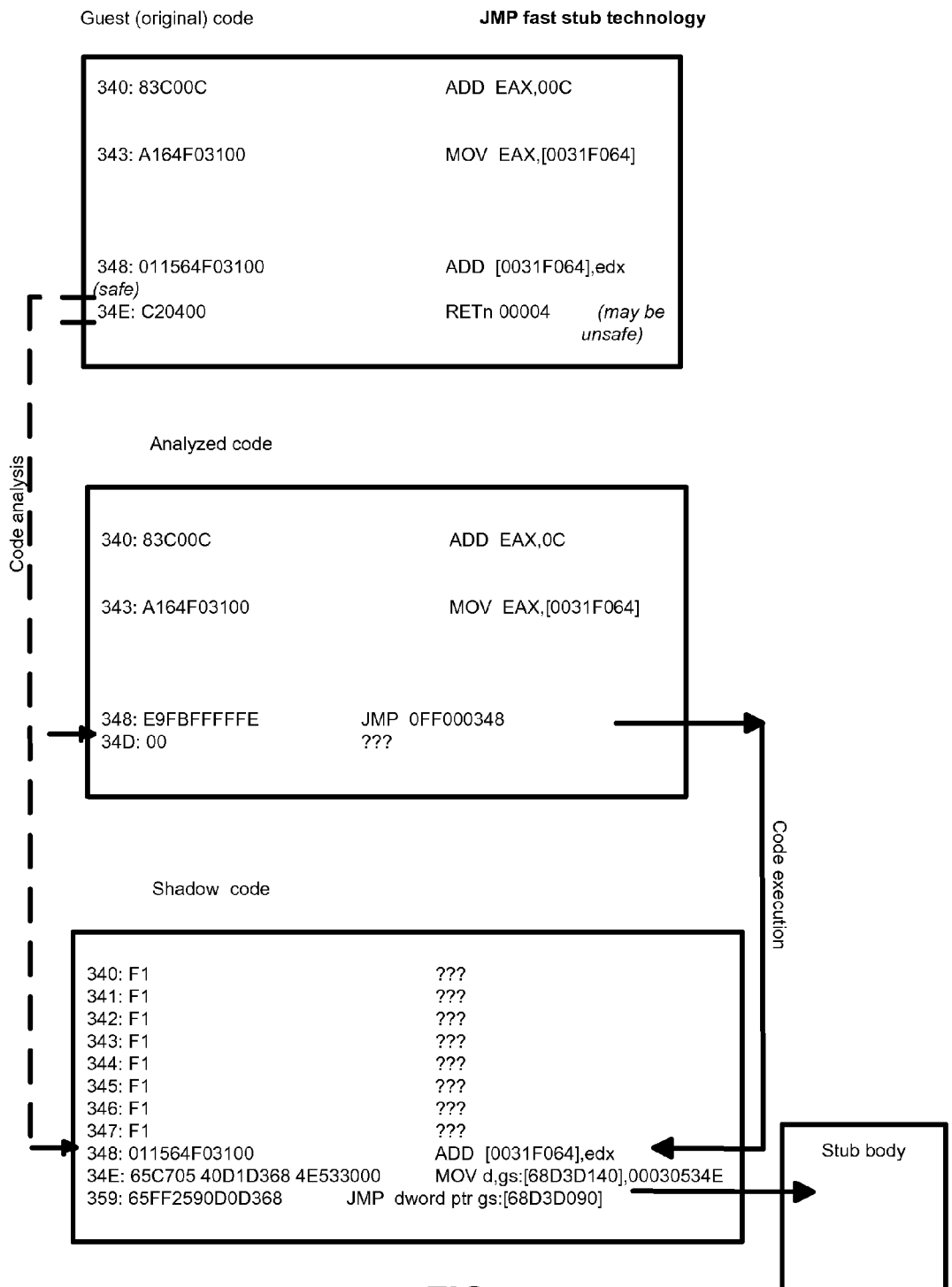
FIG. 5 illustrates an example of fast stubs technology as applied to the INTEL architecture and the RET(n) instruction.

FIG. 5 illustrates an example of fast stub technology as applied to the INTEL architecture and the RET(n) instruction. As shown in FIG. 5, the guest code contains a number of instructions, starting with add EAX, OC (in other words, adding the constant OC (hex) to the current contents of the register EAX). The RET(n) instruction, which may be unsafe, is replaced in the analyzed code by a five-byte-long JMP instruction. To preserve the address offsets within the code, both the byte at which the RET(n) is located, and the previous four bytes, are overwritten by the (near) JMP instruction. The JMP instruction transfers control to the shadow code, where the add instruction is executed. Then control is switched to the actual fast stub body by the indirect JMP instruction (through the stub handler pointer). Once the stub is executed, control is either transferred back to the RET(n) instruction or the RET(n) instruction is emulated in the Virtual Machine Monitor.

Figure 6:
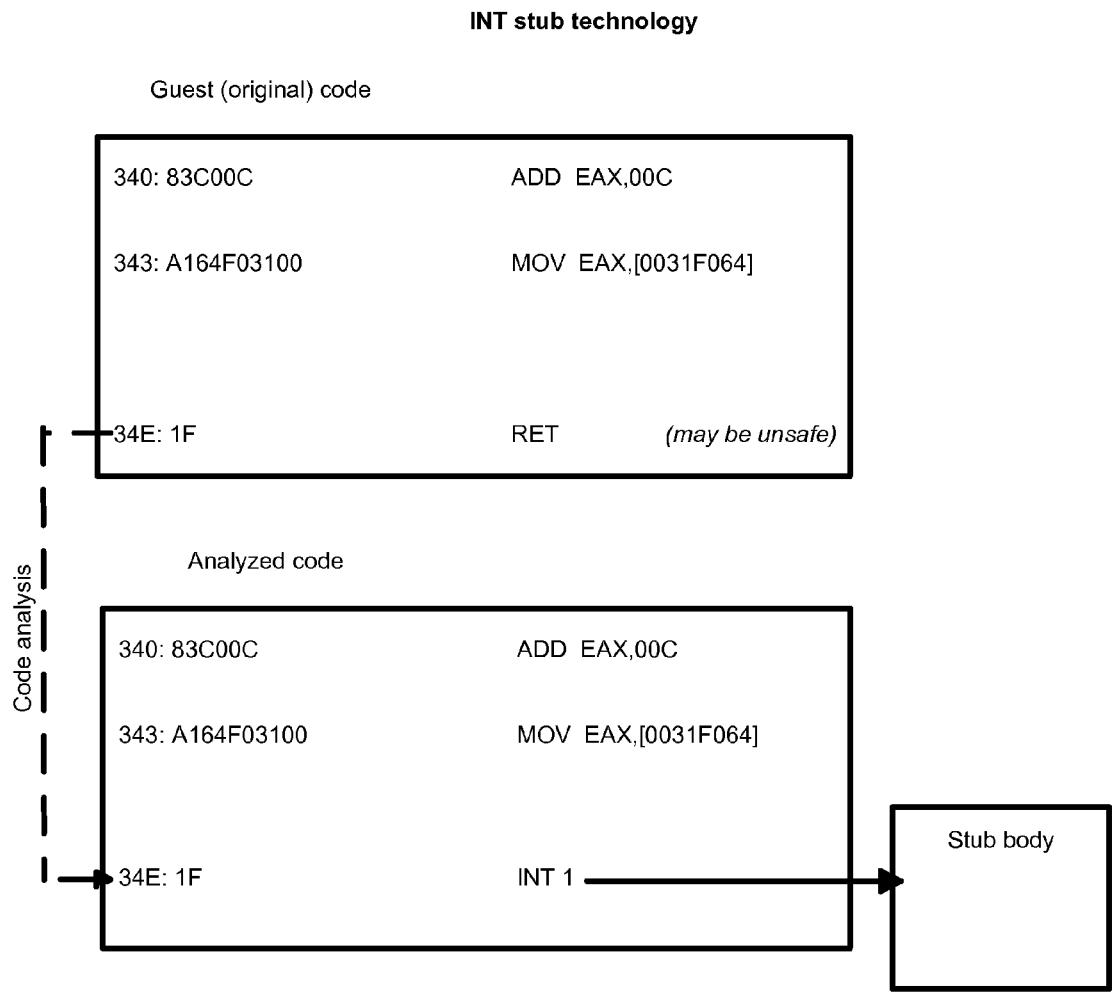
FIG. 6 illustrates the application of the fast stub technology to software interrupts.

FIG. 6 illustrates the application of the fast stub technology to interrupts (although it should be understood that the present invention is not limited to this embodiment). Here, the guest code contains the RET instruction, which is replaced by an INT1 interrupt. The INT1 interrupt directly calls the stub body, which determines whether the instruction is safe or unsafe. The handling of the RET instruction in the fast stub is as described above.

Unsafe CALL or JMP instructions can be handled with or without modification of opcodes. In one embodiment, when the processor supports page execution attributes (such as "execute only" or "no execute") any attempt to transfer control pages out of the current frame, however, will raise a page fault exception (only pages of the current frame will be marked as available for code execution). Consequently, the required frame can be accessed after the original guest code is analyzed.

If the stubs are used for accelerated emulation, it is possible to save the guest context. For example, for instructions, which are processed using the stub technique, a simple emulation can be used that includes checking the address of the transfer of control and intra-frame transfer of control, or frame switching. During the execution of the code that has been processed by the software debugger, the addresses of the instructions are not changed. In one approach, the addresses transferred to the instruction pointer register (EIP) during execution of the analyzed code with the breakpoints inserted are identical to addresses of the original code. After execution of the stub, the EIP addresses will be changed, but the original EIP addresses can be obtained from a stack, because when the stub is called, the initial EIP is saved in the stack.

It should be noted that the approach described herein is applicable to most, if not all, types of potentially unsafe instructions, not just JMP, CALL, RET or instructions that transfer control, where the stub can verify whether the potentially unsafe instruction (whatever it may be) is in fact unsafe, or safe. The invention can also be used for stubbing a group of sequential instructions. One example of group instruction stubbing on the Intel processor is marking pair MOV EAX, CR3; MOV CR3, EAX flushed TLB cached, by a single fast stub.

Figure 7:
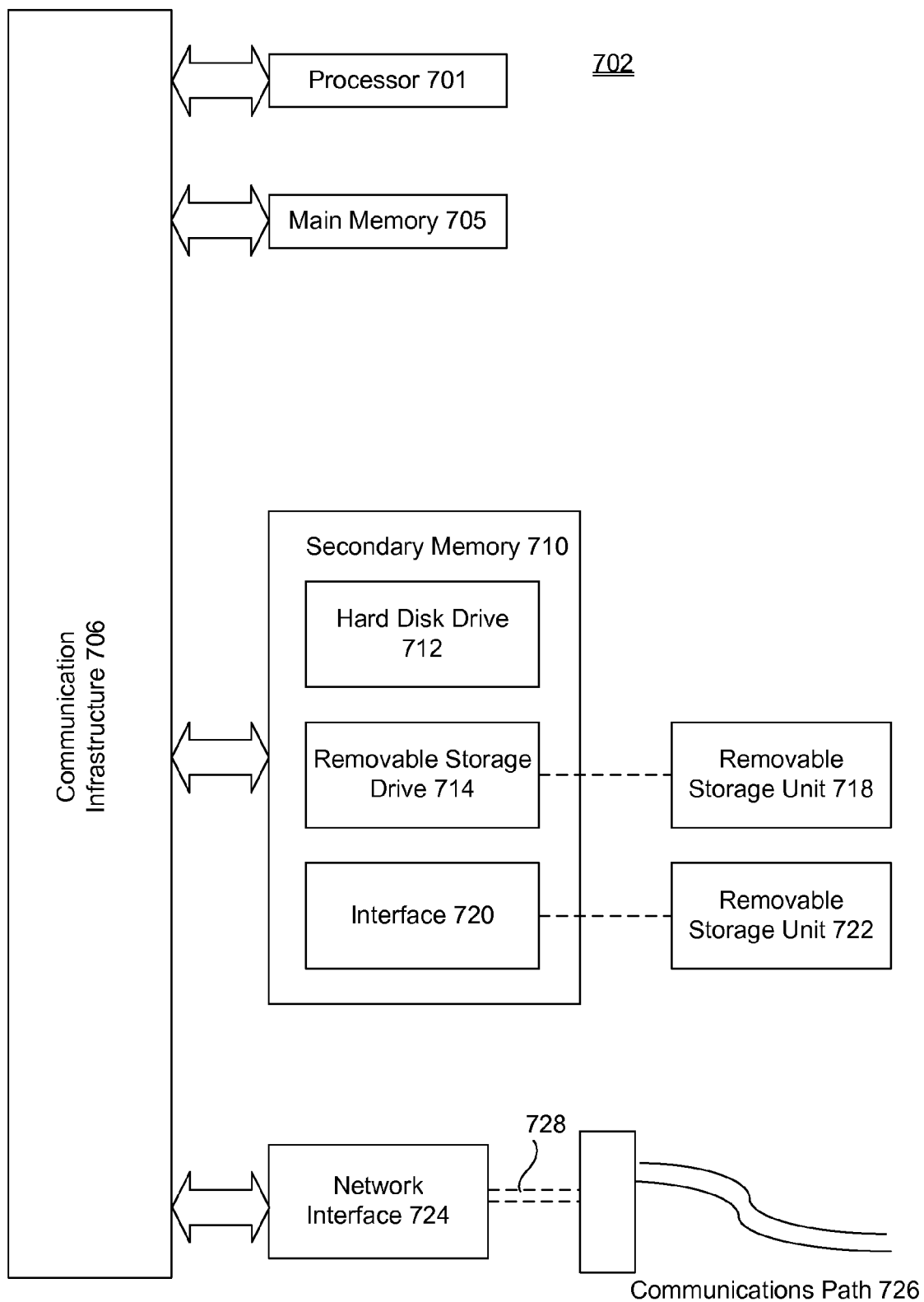
FIG. 7 illustrates an exemplary computer system on which the invention may be implemented.

An example of the computing system 702 on which the invention may be implemented is illustrated in FIG. 7. The computing system 702 includes one or more processors, such as processor 701. The processor 701 is connected to a communication infrastructure 706, such as a bus or network. Various software implementations are described in terms of this exemplary computer system. After reading this description, it will become apparent to a person skilled in the relevant art how to implement the invention using other computer systems and/or computer architectures.

Computing system 702 also includes a main memory 708, preferably random access memory (RAM), and may also include a secondary memory 710. The secondary memory 710 may include, for example, a hard disk drive 712 and/or a removable storage drive 714, representing a magnetic tape drive, an optical disk drive, etc. The removable storage drive 714 reads from and/or writes to a removable storage unit 718 in a well known manner. Removable storage unit 718 represents a magnetic tape, optical disk, or other storage medium that is READ by and written to by removable storage drive 714. As will be appreciated, the removable storage unit 718 can include a computer usable storage medium having stored therein computer software and/or data.

In alternative implementations, secondary memory 710 may include other means for allowing computer programs or other instructions to be loaded into computing system 702. Such means may include, for example, a removable storage unit 722 and an interface 720. An example of such means may include a removable memory chip (such as an EPROM, or PROM) and associated socket, or other removable storage units 722 and interfaces 720 which allow software and data to be transferred from the removable storage unit 722 to computing system 702.

Computing system 702 may also include one or more communications interfaces, such as communications interface 724. Communications interface 724 allows software and data to be transferred between computing system 702 and external devices. Examples of communications interface 724 may include a modem, a network interface (such as an Ethernet card), a communications port, a PCMCIA slot and card, etc. Software and data transferred via communications interface 724 are in the form of signals 728 which may be electronic, electromagnetic, optical or other signals capable of being received by communications interface 724. These signals 728 are provided to communications interface 724 via a communications path (i.e., channel) 726. This channel 726 carries signals 728 and may be implemented using wire or cable, fiber optics, an RF link and other communications channels. In an embodiment of the invention, signals 728 comprise data packets sent to processor 701. Information representing processed packets can also be sent in the form of signals 728 from processor 701 through communications path 726.

The terms "computer program medium" and "computer usable medium" are used to generally refer to media such as removable storage units 718 and 722, a hard disk installed in hard disk drive 712, and signals 728, which provide software to the computing system 702.

Computer programs are stored in main memory 708 and/or secondary memory 710. Computer programs may also be received via communications interface 724. Such computer programs, when executed, enable the computing system 702 to implement the present invention as discussed herein. In particular, the computer programs, when executed, enable the processor 701 to implement the present invention. Where the invention is implemented using software, the software may be stored in a computer program product and loaded into computing system 702 using removable storage drive 714, hard drive 712 or communications interface 724.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for handling potentially unsafe instructions in a Virtual Machine, comprising:

(a) generating a set of pages of analyzed code, the set being based on original guest code and being a contiguous combination of sequential pages, such that when executing the analyzed code, a value of guest offset address is the same as a value of a real offset address; and (b) replacing at least some potentially unsafe instructions with a transfer to a stub in non-privileged code, wherein
   (i) for a potentially unsafe instruction identified as unsafe, the stub switches a Virtual Machine Monitor context to full emulation; and
   (ii) for a potentially unsafe instruction identified as safe, the stub bypasses the instruction in the Virtual Machine context.

2. The method of claim 1, wherein the potentially unsafe instructions include transfer control instructions.

3. The method of claim 2, wherein the transfer control instructions include any of JMP, CALL, RET and RET(n).

4. The method of claim 2, wherein the stub checks the address to which control transfers and make decision about instruction is safe or unsafe based on the address.

5. The method of claim 1, wherein control is transferred to the stub using an INT(n).

6. The method of claim 1, wherein control is transferred to the stub using a jump.

7. The method of claim 1, wherein the stub is located in a separate memory area from the analyzed code.

8. A method for handling potentially unsafe instructions in a Virtual Machine, comprising:
   (a) generating a set of pages of analyzed code based on original guest code and being a contiguous combination of sequential pages, such that when executing the analyzed code, a value of guest offset address is the same as a value of a real offset address;
   (b) generating shadow frames corresponding to the set of pages;
   (c) identifying the potentially unsafe instructions within the set of pages;
   (d) replacing the potentially unsafe instructions with transfer instructions to corresponding shadow frames;
   (e) placing code overwritten by the control transfer instruction in the shadow frames;
   (f) adding, to the shadow frame, instructions that transfers control to a stub in non-privileged code;
   (g) wherein
      (i) for the instruction identified as unsafe, the stub switches Virtual Machine Monitor context to full emulation; and
      (ii) for the instruction identified as safe, the stub executes the control transfer in a non-privileged mode.

9. The method of claim 7, further comprising grouping multiple sets of pages of analyzed code into a superframe having a contiguous address space.

10. The method of claim 7, further comprising grouping multiple sets of pages of analyzed code and multiple shadow frames into a superframe having a contiguous address space.

11. A computer useable storage medium having computer program logic stored thereon for executing on a processor for handling potentially unsafe instructions, the computer program logic comprising executable code for performing the steps of claim 8.

12. A method for handling transfers of control in a Virtual Machine, comprising:
   (a) analyzing original guest code to identify potentially unsafe instructions in the original guest code;
   (b) generating analyzed code with the potentially unsafe instructions replaced by breakpoints;
   (c) placing the analyzed code into a set of pages of analyzed, wherein the set comprises a plurality of sequential consecutive pages in memory, and each page of the set corresponds to a page of original guest code;
   (d) wherein a page sequence in the set corresponds to a page sequence of the original guest code, and when executing the analyzed code, a value of guest offset address is the same as a value of a real offset address;
   (e) associating the set with a memory segment, such that a processor can address the analyzed code in the frame using segment-based addressing.

13. The method of claim 12, further comprising:
   (a) generating a shadow frame such that code in the shadow frame is executed instead of the analyzed code when the analyzed contains an unsafe transfer of control instruction;
   (b) replacing the unsafe transfer of control instruction in the set of analyzed pages with control transfer instructions to code in the shadow frames;
   (c) replacing code overwritten by the control transfer instruction in the shadow frame; and
   (d) adding, to the shadow frame, instructions that transfer control to a stub in non-privileged code.

14. The method of claim 12, wherein the stub is located in a separate memory area from the analyzed code.

15. The method of claim 12, further comprising grouping multiple sets of pages of analyzed code into a superframe having a contiguous linear address space.

* * * * *